United States Patent [19]

Zievers et al.

[11] Patent Number: 4,725,356

[45] Date of Patent: Feb. 16, 1988

[54] TUBULAR PRESSURE FILTER

[75] Inventors: James F. Zievers, LaGrange; Paul Eggerstedt, North Riverside, both of Ill.

[73] Assignee: Industrial Filter & Pump Mfg. Co., Cicero, Ill.

[21] Appl. No.: 827,738

[22] Filed: Feb. 10, 1986

[51] Int. Cl.$^4$ .................. B01D 29/24; B01D 46/24
[52] U.S. Cl. .................. 210/323.2; 210/346; 210/450; 210/451; 210/486; 55/484
[58] Field of Search ............ 55/372, 378, 482, 484; 210/232, 323.2, 331, 339, 346, 347, 451, 486, 450

[56] References Cited

U.S. PATENT DOCUMENTS

| | | | |
|---|---|---|---|
| 4,461,707 | 7/1984 | Thayer et al. | 210/339 |
| 4,522,661 | 11/1985 | Morgan | 210/323.2 |
| 4,522,669 | 11/1985 | Sekellick | 210/323.2 |
| 4,522,717 | 6/1985 | Brust | 210/323.2 |
| 4,604,201 | 8/1986 | Müller | 210/323.2 |

FOREIGN PATENT DOCUMENTS

| | | | |
|---|---|---|---|
| 2019329 | 11/1971 | Fed. Rep. of Germany | 210/323.2 |
| 63038 | 11/1968 | German Democratic Rep. | 210/323.2 |
| 7874 | of 1903 | United Kingdom | 210/323.2 |
| 14396 | of 1913 | United Kingdom | 210/323.2 |

Primary Examiner—Richard V. Fisher
Assistant Examiner—Wanda L. Millard
Attorney, Agent, or Firm—Edmond T. Patnaude

[57] ABSTRACT

A filter apparatus for clarifying liquids or gases includes a tank having a rigid horizontally disposed tube sheet contained therein for supporting a plurality of elongate tube filter elements. Each tube filter has an enlarged hub at one end configured with an exterior annular beveled surface. The tube sheet has apertures through which the tube filters extend and each aperture is configured with an interior annular beveled surface serving to cooperate with the beveled surface of a tube filter and prevent its downward movement within the tank. A gasket is interposed between the beveled surfaces of the tube sheet aperture and tube filter, and pins extend at an angle through the tube sheet into the hub of each filter for securing the filters in compressed engagement with the gaskets. The arrangement of the beveled surfaces and pins is such that the filter tubes remain sealed to the tube sheet regardless of the effects of differing coefficients of thermal expansion as between the filter tubes and tube sheet.

3 Claims, 3 Drawing Figures

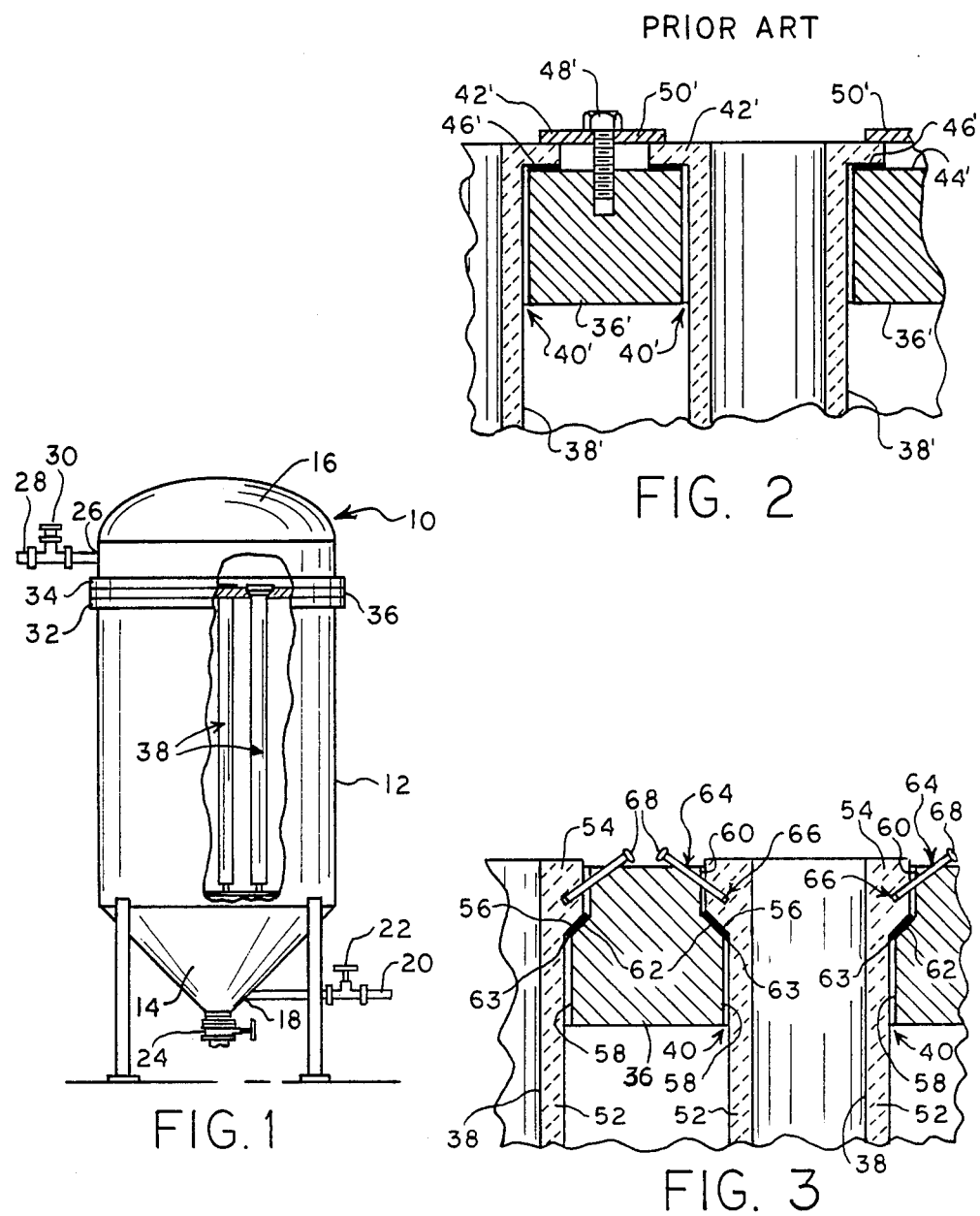

TUBULAR PRESSURE FILTER

BACKGROUND OF THE INVENTION

1. Field of the Invention

The present invention relates generally to filtration apparatus for removing suspended solids in a liquid or gas stream, and more particularly relates to a new and improved tube-type filter element for use in such apparatus.

2. Description of the Prior Art

Tube-type filters for use in purifying fluids ordinarily found in industrial applications typically include a vertically mounted tank having a lower inlet port and an upper outlet port with a plurality of generally elongate filter tubes mounted therebetween. The filter tubes are constructed of a porous material, such as ceramic, and are suspended in spaced relation one to another within the filter tank from a relatively rigid support member called a "tube sheet". The lower ends of the filter tubes are closed, or capped, such that fluid entering the inlet port of the filter tank must pass through the walls of the filter tubes before reaching the outlet port. Entrained solids within the fluid are thereby deposited on the walls of the filter tubes.

After a period of time, solid material deposited in the form of a cake on the walls of the filter tubes can blind the filter thereby preventing fluid from flowing between the inlet and exit ports of the filter. Accordingly, it becomes necessary to either clean or replace the filter tubes. To facilitate such cleaning or replacement, it is known to construct the filter tubes with an integral upper flange and to suspend the filter tubes within apertures provided in the tube sheet such that the tubes are removable. A gasket disposed between the lip of the flange and the upper surface of the tube sheet prevents leakage of unfiltered fluid from the lower side of the tube sheet to the upper side. To secure the filter tubes to the tube sheet, a bolt and washer arrangement is used for compressing the flange against its respective gasket.

A limitation of the foregoing arrangement for securing the filter tubes to the tube sheet resides in the inability of the bolt and washer to maintain the filter tube in sealed relation to the tube sheet in high temperature applications. For example, high temperature fluids can cause differential expansion between the filter tube flange and tube sheet. The effects of differential expansion are particularly prevalent in filters having filter tubes constructed of a ceramic material, which has a low coefficient of thermal expansion by comparison to a steel tube sheet, for example. In addition, a ceramic filter tube is characteristically brittle, and thus its flange is highly susceptible to fracture when a bolt and washer arrangement is used to secure the flange to the tube sheet.

SUMMARY OF THE INVENTION

Accordingly, an object of the invention is to provide an improved means for mounting a filter tube to a tube sheet in a filtering apparatus.

Another object of the invention is to provide such an improved mounting means which has the capability of maintaining a fluid tight seal between the filter tube and tube sheet over a wide range of fluid temperatures.

Still a further object of the invention is to provide such an improved mounting means which will permit removal and replacement of the filter tube with relative ease.

In accomplishing these and other objectives of the present invention, there is provided a filter apparatus comprising a tank having an inlet port and an outlet port with a generally rigid tube sheet disposed therebetween. A plurality of filter tubes have distal ends which are sealed with a cap and proximal ends configured with a generally cylindrical hub which is greater in diameter than the diameter of the body portion of the tubes. The juncture of the hubs and body portions define beveled annular surfaces. The sheet member has a plurality of generally circular apertures formed therein for receiving the hubs of the filter elements. The apertures are also configured to define a beveled annular surface for forming an interface with the beveled surfaces of each respective filter element. An annular gasket interposed between the beveled surfaces of the apertures and filter elements forms a fluid tight seal between the filter elements and tube sheet. For securing the hubs of the filter elements to the tube sheet a plurality of removable pins extend through the tube sheet and into each of the hubs.

DESCRIPTION OF THE DRAWINGS

Further objects and advantages and a better understanding of the present invention will be had by reference to the following detailed description taken in connection with the accompanying drawings wherein:

FIG. 1 is an elevational view, partly broken away, showing a vertical tube filter and the manner in which filter tubes embodying the present invention may be mounted therewithin;

FIG. 2 is a fragmentary, sectional view illustrating a prior art means for mounting a filter tube to a tube sheet in the filter illustrated in FIG. 1;

FIG. 3 is a fragmentary, sectional view of a filter tube mounting means in accordance with the present invention.

Referring now to the drawings and more particularly to FIG. 1 thereof, there is shown a multiple tube filter apparatus, designated generally by the reference numeral 10, including as its principal elements a generally cylindrical, vertically disposed tank 12 having a conical bottom portion 14 and a dome shaped upper cover 16. Connected to a port 18 provided in the wall of the conical portion 14 is an inlet supply conduit 20 and valve 22 for admitting pressurized fluid into the filter 10. At its lowermost end, the conical section 14 is fitted with a drain-down valve 24 for purposes of emptying and cleaning the filter 10. Extending from a port 26 provided in the wall of the upper domed member 16 is a discharge conduit 28 and valve 30. Interposed between a flange 32 provided on the tank and a flange 34 provided on the domed section 16 is a generally flat circular tube sheet 36. The tube sheet 36 is compressed between the flanges 32 and 34 and is sealed therebetween by suitable gaskets and fastening means (not shown) in a manner well known in the art. The tube sheet 36 supports a plurality of generally elongate filter tubes 38 extending downwardly therefrom in a generally vertical disposition.

Turning now to FIG. 2, there is illustrated a prior art means for securing filter tubes to a tube sheet in filtering apparatus of the type illustrated in FIG. 1. The tube sheet 36' can be seen therein to include a plurality of relatively straight walled vertical apertures 40', 40' suitably dimensioned to slidably receive a respective filter tube 38'. Each filter tube 38' has an annular flange 42' formed at its upper end overlying a portion 44' of the generally flat upper surface of the tube sheet 36'. Interposed between the flange 42' and the upper surface 44' of the tube sheet is a generally annular gasket 46'. In order to compress the flange 42' into sealing engagement with the gasket 46', the prior art assembly includes a bolt 48' which is threadedly received by the tube sheet 36' and bears against a washer 50' which, in turn, is compressed against the flange 42' of the filter tube 38'. In practice, the apertures 40', 40' of the tube sheet 36' may be spacially arranged such that a single bolt 48' and washer 50' can secure as many as three filter tubes 38' within their respective apertures 40', 40'.

With reference now to the preferred embodiment of the present invention illustrated in FIG. 3, there is shown a filter tube 38 having a generally cylindrical straight walled body portion 52, terminated at its lowermost end with a cap (not shown), and an upper enlarged hub portion 54, the juncture of which portions 52 and 54 together define an annular beveled surface 56. Correspondingly, the tube sheet 36 is provided with apertures 40, 40 comprising a generally straight walled aperture portion 58 suitably dimensioned to slidingly receive the body portion 52 of the filter tube 38 and with an enlarged straight walled aperture portion 60 dimensioned to slidingly receive the hub portion 54 of the filter tube 38. Between wall portions 58 and 60 is a generally annular beveled surface portion 62. Interposed between surface portions 56 and 62 is a gasket 63 suitably configured to maintain a seal between the filter tube 38 and tube sheet 36.

In order to secure the filter tube 38 firmly within a respective aperture 40 of the tube sheet 36, in accordance with the present invention the tube sheet 36 is provided with a plurality of inclined through holes 64, 64 and the hub 54 of the filter tube 38 is provided with corresponding inclined blind holes 66, 66. When the filter tube 38 is properly installed within the tube sheet 36, each blind hole 66 of the hub 54 is in registry with a respective through hole 64 provided in the tube sheet 36. A plurality of pins 68, 68 are slidingly received by the through holes 64, 64 and by the holes 66, 66 of the hub 54.

It can be appreciated that the preferred embodiment of the present invention provides not only a convenient but a highly effective means for securing a filter tube 38 within a tube sheet 36 of a filter 10. Upon installation of the filter tubes 38, 38 gasket 63 is installed in position on the annular surface 62 and the filter tube 38 is lowered into position within the tube sheet 36. The filter tube 38 is then adjusted rotationally such that the blind holes 66, 66 are each in registry with a respective through hole 64 of the tube sheet 36. Then, by downward pressure exerted manually on the filter tube 38, the gasket 63 is compressed and the blind holes 66, 66 come into alignment with the through holes 64, 64 such that pins 68, 68 can be manually inserted therethrough. Because of the angle of the pins 68, 68 with respect to the tube sheet 36, the filter tube 38 is firmly retained within its respective aperture of the tube sheet 36 and the effects of thermal expansion due to a high temperature fluid within the filtering unit 10 are minimal at the interface between the beveled surfaces 56 and 62. Thus, the gasket 63 is maintained in sealing relation between the filter tube 38 and tube sheet 36.

Moreover, the surface 62 of the tube sheet 36 need not be beveled, but instead can be formed as a right-angle shoulder. Likewise, the filter tube 38 can be provided with a right-angle shoulder instead of a beveled surface 56, and a suitable gasket 63 may be positioned at the interface between the tube sheet 36 and filter tube shoulders to form a seal therebetween. In such an embodiment, the pins 68, 68 are equally capable of securely fastening the filter tubes 38 in place while maintaining the filter tubes 38 in sealed relation despite the effects of differential thermal expansion with temperature change.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed as new and desired to be secured under Letters Patent of the United States is:

1. Filter apparatus, comprising in combination
a tank having an inlet port and an outlet port,
a rigid planar sheet member disposed within said tank in sealed relationship therewith and extending across said tank between said inlet and said outlet,
said sheet member having a plurality of generally circular openings extending from one face of said sheet member to the other face of said sheet member,
a plurality of tubular filter elements each including a generally cylindrical body portion closed at one end and having an external annular hub at the other end,
said filter elements being respectively disposed within said openings with said closed ends being located on one side of said sheet member and said hubs being located on the other side of said sheet member in sealed relationship therewith,
a plurality of through holes in said sheet member respectively extending from said openings to said other side of said sheet,
the axes of said through holes being inclined with respect to the plane of said sheet member,
said hubs being provided with blind holes respectively aligned with said through holes, and
a plurality of rigid pin members positioned in said through holes and extending into said blind holes for securing said filter elements to said sheet member.

2. Filter apparatus according to claim 1 comprising
a plurality of annular shoulders provided on said sheet member and respectively surrounding said openings,
said shoulders being located between said faces of said sheet member,
said hubs being provided with annular shoulders complementary to said annular shoulders on said sheet member, and
a plurality of annular gaskets compressed between said annular shoulders on said hubs and said annular shoulders on said sheet member.

3. Filter apparatus according to claim 2 wherein said annular shoulders are beveled.

* * * * *